March 27, 1928.  1,663,740
H. C. VARNER ET AL
AUTOMOBILE SIGNAL CONTROLLING MECHANISM
Filed Oct. 23, 1926  2 Sheets-Sheet 1
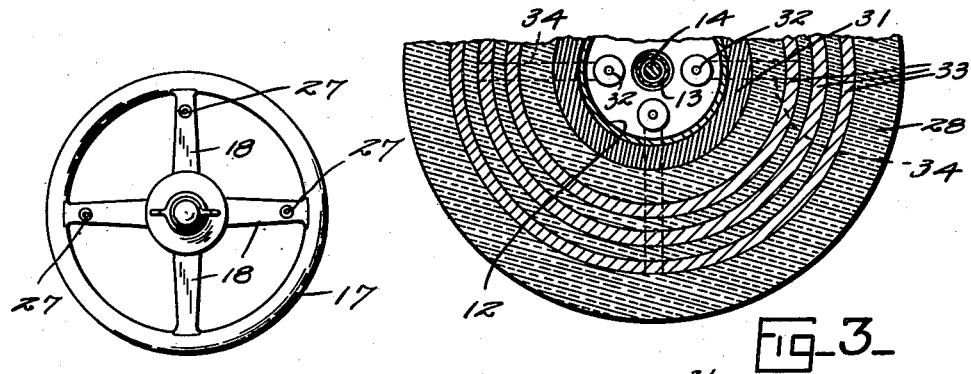
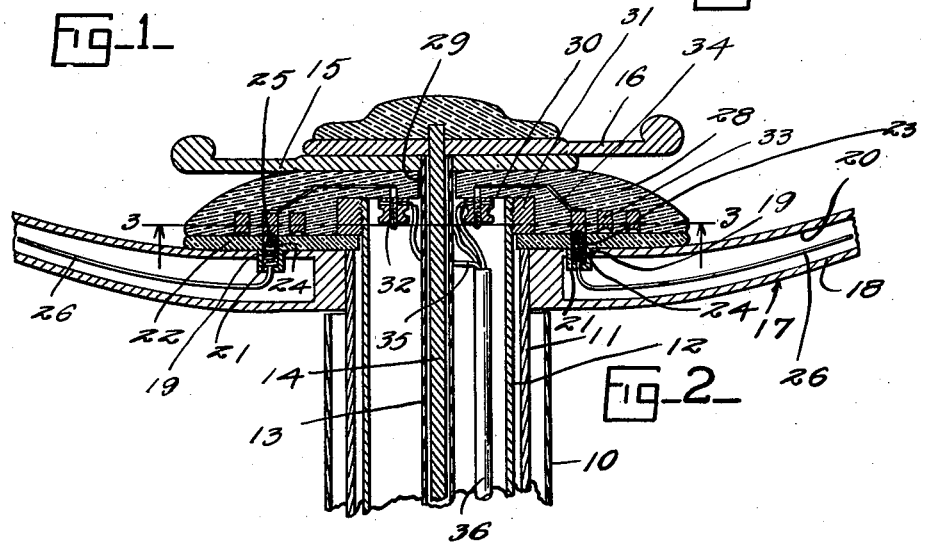
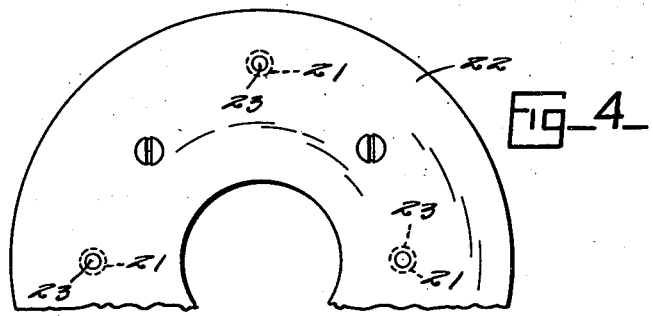
INVENTORS
H. C. Varner
J. M. Koch
BY
Watson E. Coleman ATTORNEY.

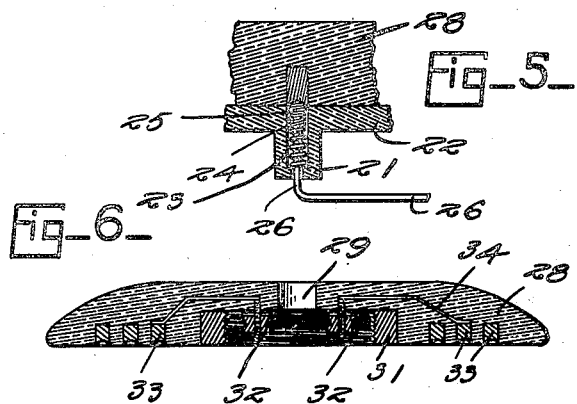
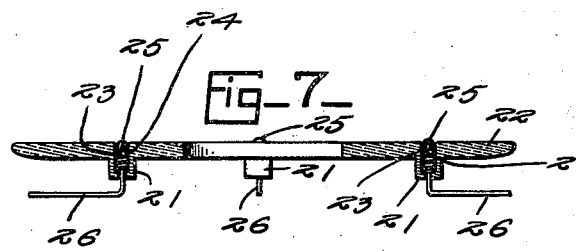
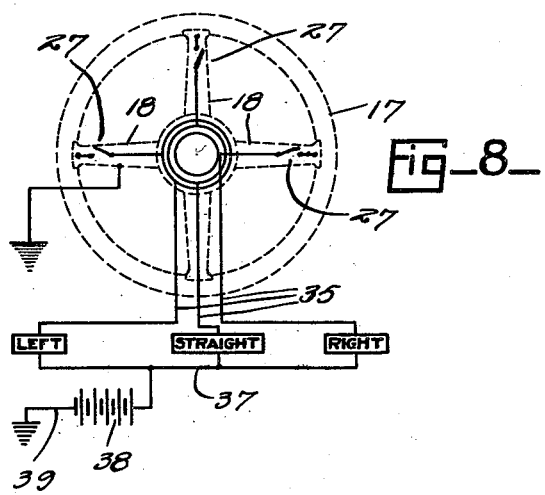

Patented Mar. 27, 1928.

1,663,740

UNITED STATES PATENT OFFICE.

HOWARD C. VARNER AND JACOB M. KOCH, OF ST. JOSEPH, MISSOURI.

AUTOMOBILE SIGNAL-CONTROLLING MECHANISM.

Application filed October 23, 1926. Serial No. 143,758.

This invention relates to automobile signal controlling mechanism and more particularly to a device of this character embodying switches located upon the steering wheel of the vehicle.

An important object of the invention is the provision of means for transmitting current from the switches to the signal lights, for the front and rear of car which eliminates any tendency on the part of the lead wires to twist and thus become worn or destroyed.

A further object of the invention is to provide a novel mounting for a circuit maintaining device including parts secured to relatively rotatable portions of the steering mechanism whereby this circuit maintaining device may be very readily attached to the steering mechanism and will be securely held against movement with relation thereto.

These and other objects we attain by the construction shown in the accompanying drawings, wherein for the purpose of illustration is shown a preferred embodiment of our invention and wherein:—

Figure 1 is a plan view of a steering wheel embodying signal operating mechanism constructed in accordance with our invention;

Figure 2 is an enlarged vertical sectional view through the steering wheel and circuit establishing mechanism;

Figure 3 is a section on the line 3—3 of Figure 2;

Figure 4 is a top plan view of the lower element of the circuit establishing mechanism;

Figure 5 is an enlarged sectional view showing the means for maintaining the circuit between the elements of the circuit establishing mechanism;

Figure 6 is a detached sectional view of the upper section of the circuit establishing mechanism;

Figure 7 is a similar view of the lower element thereof;

Figure 8 is a wiring diagram showing the manner of connecting the signal operating mechanism with the signal.

Referring now more particularly to the drawings, the numeral 10 indicates the outer housing of a steering post within which are arranged an outer rotatable tube 11 and an inner stationary tube 12. The inner stationary tube provides a housing for concentric rotating elements 13 and 14 to which are attached the gas and spark levers 15 and 16 of the vehicle. To the outer rotatable tube is secured a steering wheel 17, at present illustrated as having hollow or channeled spokes 18. The foregoing construction comprises the normal steering post construction of the vehicle and forms no part of our invention except in combination with the mechanism hereinafter set forth.

In accordance with our invention, we form in the upper surface of the spokes 18 openings 19 communicating at their inner ends with the recesses 20 of the hollow or channeled spokes and adapted to receive lugs 21 formed upon the under surface of an insulating disk 22 seated upon the upper surface of the steering wheel in surrounding relation to the upper end of the stationary tube 12. These lugs, by their engagement in the openings 19, hold the disk 22 against rotation with relation to the steering wheel. The disk 22 has bores 23 extending downwardly into each lug 21 within which are slidably mounted metal cups 24 providing seats for balls 25. To the metal cup is attached a lead wire 26 which extends through an opening formed in the bottom of the lug and longitudinally of the recess 20 to the outer end of the spoke where it is connected to one contact of a push button switch 27. The other contact of the switch, as diagrammatically indicated in Figure 8, is electrically connected with the ground, preferably by attaching the same to the metallic spoke of the steering wheel. The disk 22 forms the lower member of the circuit maintaining mechanism.

The upper member of the circuit maintaining member is likewise in the form of a disk 28 having a central opening 29 for the passage of the control elements 13 and 14. The under surface of the disk is recessed, as at 30, and the walls of the recess are threaded for engagement with the threaded upper end of the stationary tube 12, preferably by embedding in the disk an interiorly threaded ring 31. In the upper wall of the recess are mounted binding posts 32 corresponding in number to the lugs 21 of the disk 22. Embedded in the under surface of the disk are a plurality of concentric metal rings 33, the spacing of which from the axis of the steering column corresponds to the spacing of the bores of the disk 19 therefrom. These rings have their lower faces grooved and exposed at the under surface of the disk 28 for contact with the balls 25. Each ring 33 is electrically connected by a lead 34 with one of the binding posts 32. From the binding posts 32 lead wires 35 are extended through a cable 36 to a suitable signal, such as is diagrammatically indicated in Figure 8. From this signal lead wires 37 are connected to one terminal of a battery 38, the opposite terminal of which is grounded, as indicated at 39.

It will be noted that the application of the levers 15 and 16 to the controls 13 and 14 will prevent vertical displacement of the disk 28, so that the upper contact between the rings 33 and the balls 19 will at all times be maintained. Since the lead wires to the switches are fixed with relation to the disk 22 and the disk 28 is stationary, there will be no twisting of the lead wires which will cause wear upon and ultimate destruction of these wires. Furthermore, the wires to the signals are all included in the tubular housing 12, so that they will not cause an unsightly appearance and be constantly in the way.

Since the construction hereinbefore set forth is capable of a certain range of change and modification without materially departing from the spirit of the invention, we do not limit ourselves to such specific structure except as hereinafter claimed.

We claim:—

1. In signal operating mechanism for automobiles and the like, in combination with steering mechanism including a housing and outer rotatable and inner stationary tubes mounted within the housing, a steering wheel secured to the outer rotatable tube, a disk superimposed upon the steering wheel and having engagement therewith preventing relative rotation thereof, said disk having an opening for the passage of the inner stationary tube, a second disk secured to the stationary tube and having its face confronting the first named disk, brushes carried by the first named disk, contact rings upon the second named disk which said brushes coact and binding posts upon the lower face of the second named disk and extending within the stationary tube, the binding posts being electrically connected with the contact rings of the second disk.

2. In signal operating mechanism for automobiles and the like, in combination with steering mechanism including a housing and outer rotatable and inner stationary tubes mounted within the housing, a steering wheel secured to the outer rotatable tube, a disk superimposed upon the steering wheel and having lugs upon its under surface entering openings formed in the steering wheel, said disk having an opening for the passage of the inner stationary tube, a second disk secured to the stationary tube and having its face confronting the first named disk, brushes carried by the first named disk, contact rings upon the second named disk with which said brushes coact and binding posts upon the lower face of the second named disk and extending within the stationary tube, the binding posts being electrically connected with the contact rings of the second disk.

In testimony whereof we hereunto affix our signatures.

HOWARD C. VARNER.
JACOB M. KOCH.